United States Patent [19]

Hradil et al.

[11] Patent Number: 4,648,776
[45] Date of Patent: Mar. 10, 1987

[54] CONTINUOUS LOADING APPARATUS AND METHOD

[75] Inventors: John H. Hradil; Frank Bottomley, both of Delta; Richard Crawshay, North Vancouver, all of Canada

[73] Assignee: Inco Limited, Toronto, Canada

[21] Appl. No.: 649,857

[22] Filed: Sep. 12, 1984

Related U.S. Application Data

[63] Continuation-in-part of Ser. No. 510,765, Jul. 5, 1983, abandoned, and a continuation-in-part of Ser. No. 326,603, Dec. 2, 1981, abandoned.

[30] Foreign Application Priority Data

Nov. 6, 1981 [CA] Canada .................................. 389652
May 2, 1983 [NO] Norway ................................. 831552

[51] Int. Cl.$^4$ ........................ B65G 47/16; B65G 65/06
[52] U.S. Cl. ................................ 414/565; 198/308.1; 198/521; 414/786
[58] Field of Search ........................ 414/565, 567, 786; 198/301, 308, 507, 521, 522, 308.1, 307.1, 841

[56] References Cited

U.S. PATENT DOCUMENTS

| | | | |
|---|---|---|---|
| 940,999 | 11/1909 | Whaley | 414/565 |
| 1,414,398 | 5/1922 | Dennis | 414/565 X |
| 1,739,624 | 12/1929 | Whamond | 414/565 |
| 1,797,459 | 3/1931 | Whaley | 414/565 |
| 1,855,998 | 4/1932 | Shannon | 198/521 X |
| 1,859,263 | 5/1932 | Sloane | 198/308 |
| 1,878,037 | 9/1932 | Vodoz | 414/565 X |
| 2,707,570 | 5/1955 | Biedess | 414/565 |
| 2,859,853 | 11/1958 | Herrmann | 198/521 X |
| 3,032,325 | 5/1962 | Peterson | 414/565 X |
| 3,038,618 | 6/1962 | Whaley | 414/565 |
| 3,096,893 | 7/1963 | Biedess | 414/565 |
| 3,127,038 | 3/1964 | Allard | 414/565 |
| 3,283,877 | 11/1966 | Santa Maria | 414/565 X |
| 3,391,776 | 7/1968 | Hancock et al. | 198/308.1 X |
| 3,470,681 | 10/1969 | Saemann | 198/507 X |
| 3,517,840 | 6/1970 | Schneider | 414/565 |
| 3,574,327 | 4/1971 | Golfi et al. | 198/307.1 |
| 3,817,355 | 6/1974 | Haase | 198/841 X |
| 4,011,936 | 3/1977 | Hall | 198/522 X |
| 4,078,679 | 3/1978 | Seidel | 414/565 |
| 4,088,236 | 5/1978 | Moore | 414/565 |
| 4,196,800 | 4/1980 | Hall | 198/522 X |

FOREIGN PATENT DOCUMENTS

| | | |
|---|---|---|
| 148877 | 10/1949 | Australia . |
| 149561 | 10/1949 | Australia . |
| 626324 | 8/1961 | Canada . |
| 627493 | 9/1961 | Canada . |
| 673468 | 11/1963 | Canada . |
| 1073840 | 3/1980 | Canada . |
| 1082635 | 7/1980 | Canada . |
| 1041422 | 10/1958 | Fed. Rep. of Germany . |
| 1634708 | 7/1970 | Fed. Rep. of Germany . |
| 1921093 | 11/1970 | Fed. Rep. of Germany . |
| 1634864 | 1/1972 | Fed. Rep. of Germany . |
| 2256020 | 5/1974 | Fed. Rep. of Germany . |
| 2813202 | 10/1979 | Fed. Rep. of Germany . |
| 2906793 | 9/1980 | Fed. Rep. of Germany . |
| 1094454 | 5/1955 | France . |
| 39057 | 5/1965 | German Democratic Rep. . |
| WO83/02471 | 7/1983 | PCT Int'l Appl. . |
| 1420922 | 1/1976 | United Kingdom . |

OTHER PUBLICATIONS

"Technology-Mining Seeks Modernization", by Daniel F. Cuff, New York Times, Feb. 20, 1986, p. D2.
"Automated Mining Thrusts Inco into Profits Column", p. 10, Apr. 7, 1986, American Metal Market.
"IR, Joy Show Interest in Mining Consortium", by M. Sfiligoj, p. 32, May 12, 1986, American Metal Market.
"New Ideas for Mining at Inco", by M. P. Sassos, Jun. 1986, Engineering and Mining Journal.

Primary Examiner—Joseph E. Valenza
Assistant Examiner—David A. Bucci
Attorney, Agent, or Firm—Edward A. Steen; Raymond J. Kenny; Brian J. Wood

[57] ABSTRACT

An apparatus and method for continuously conveying ore and the like. A penetrator, rotatably disposed about a common coaxial axis shared by the forward section of an endless conveyor, fluidizes a muck pile to continuously load material onto the conveyor. The conveyor, hinged approximately amidships, is mounted above a movable frame. Actuators for independently oscillating the penetrator is provided.

14 Claims, 17 Drawing Figures

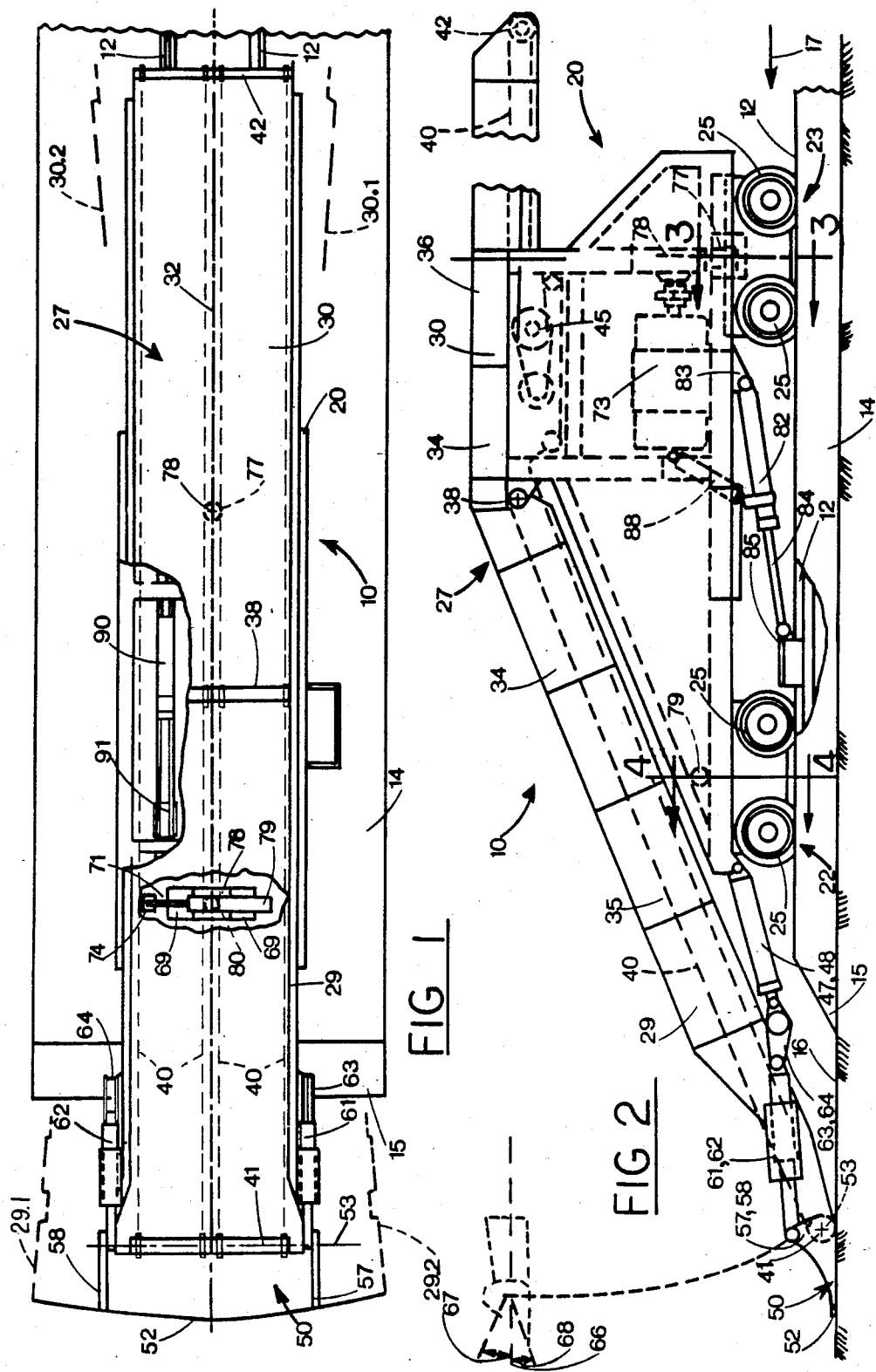

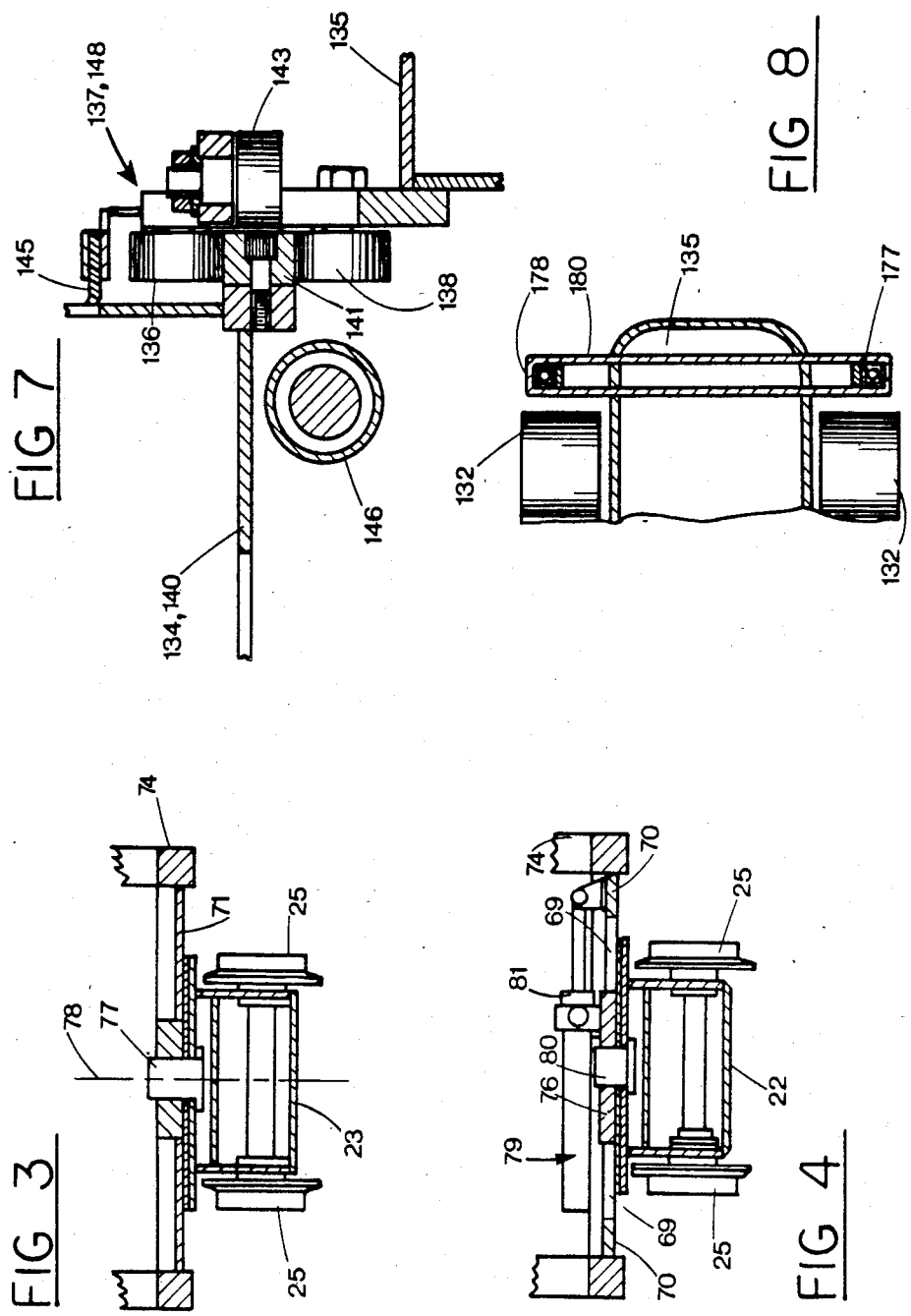

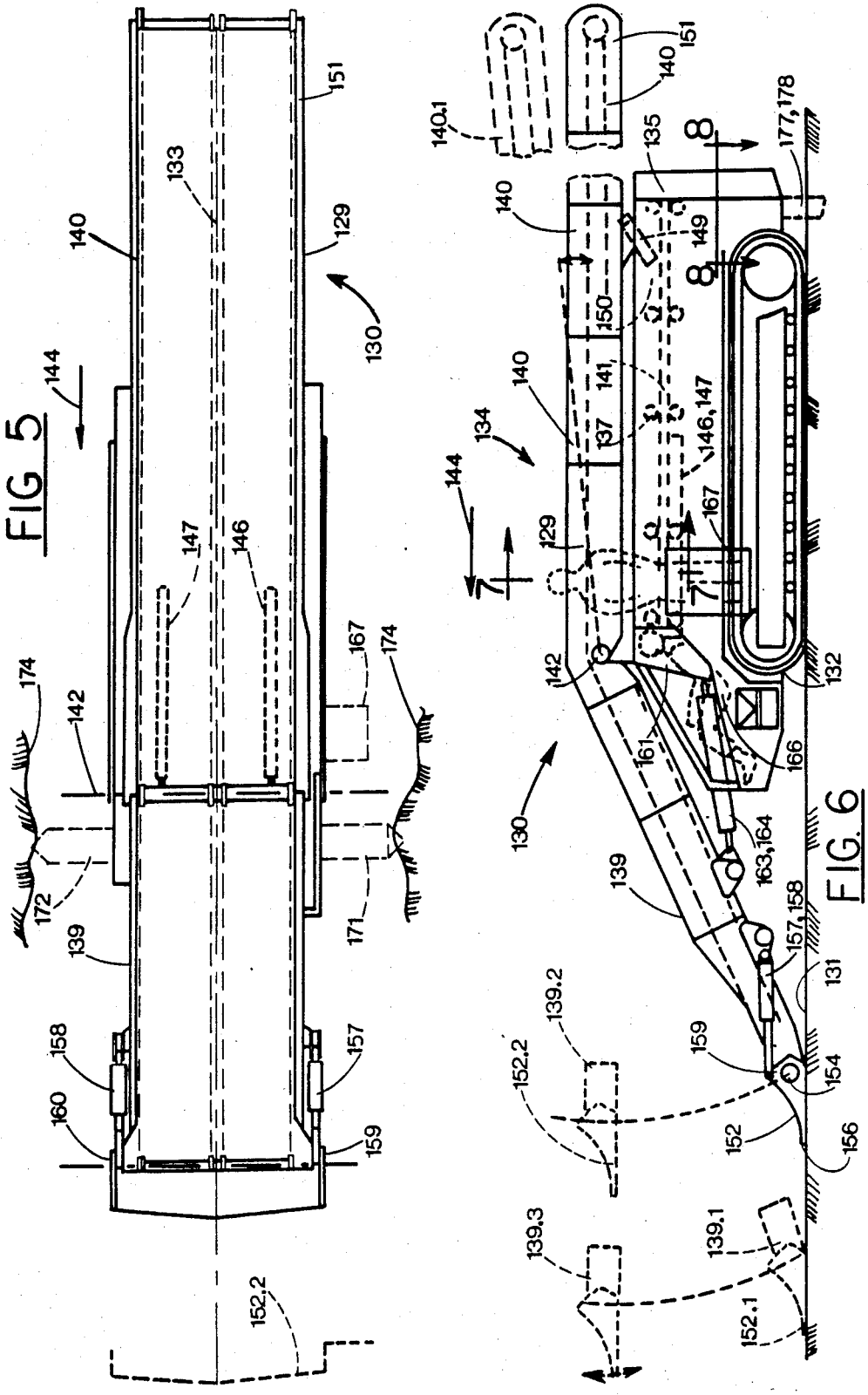

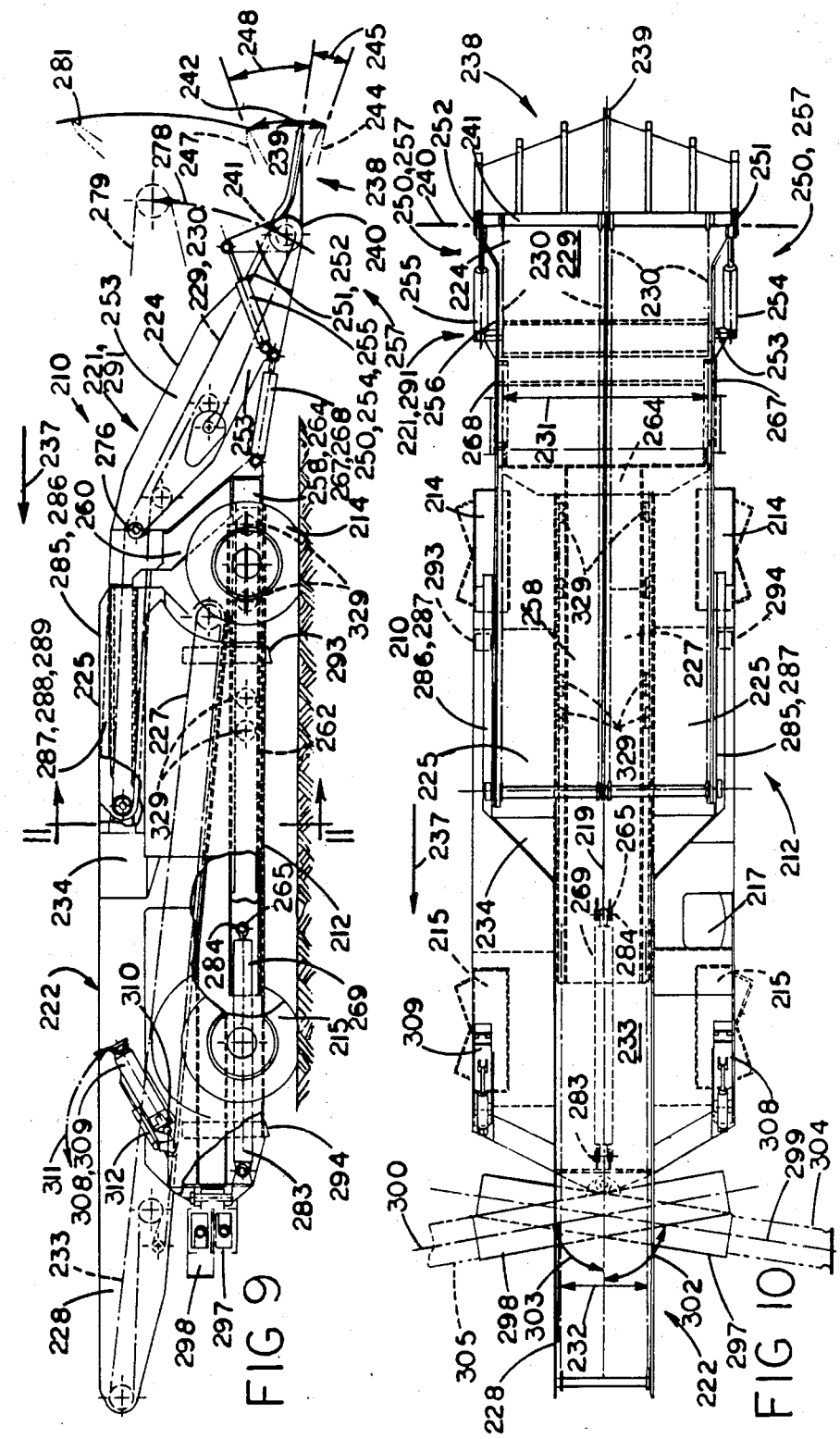

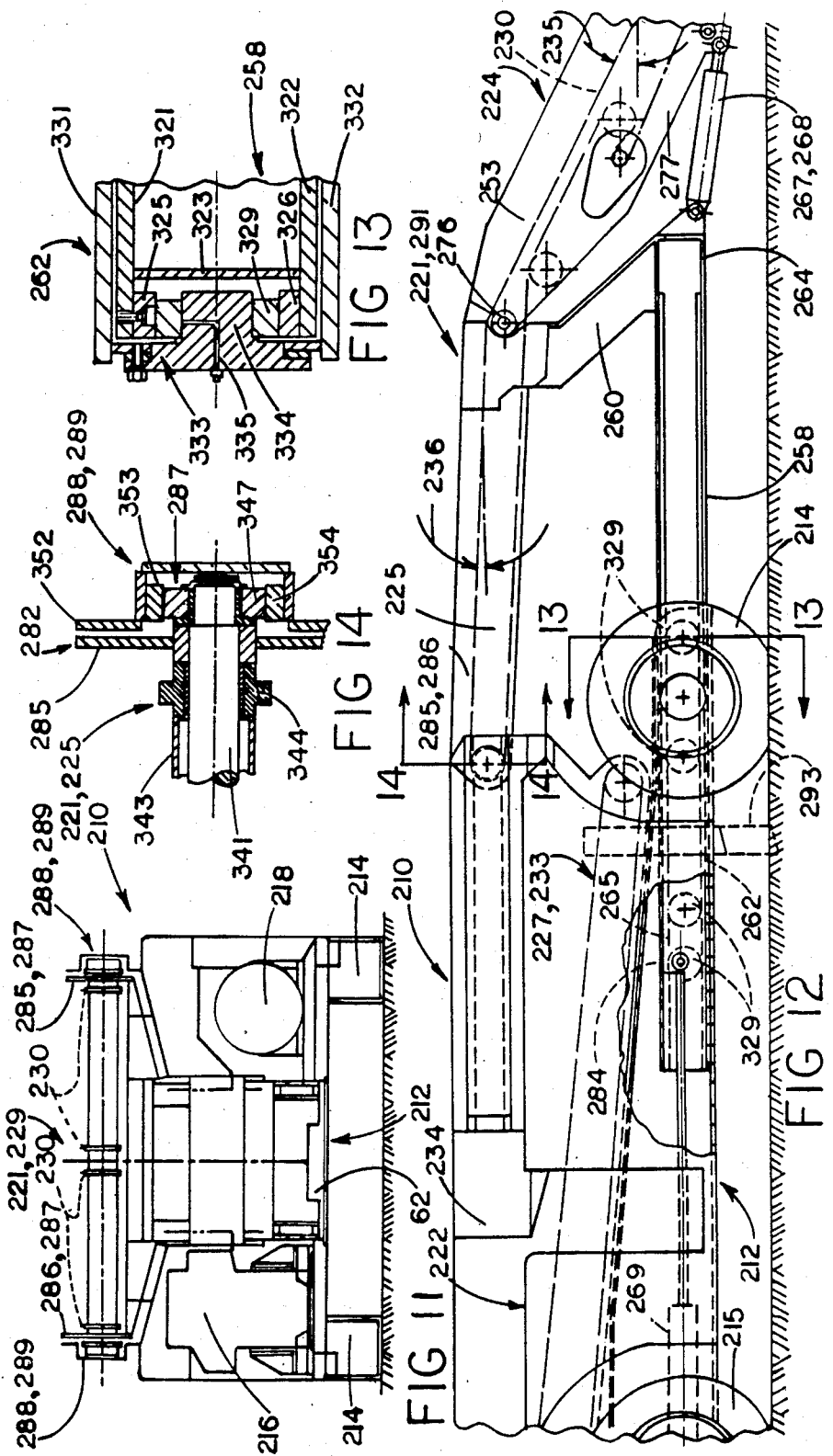

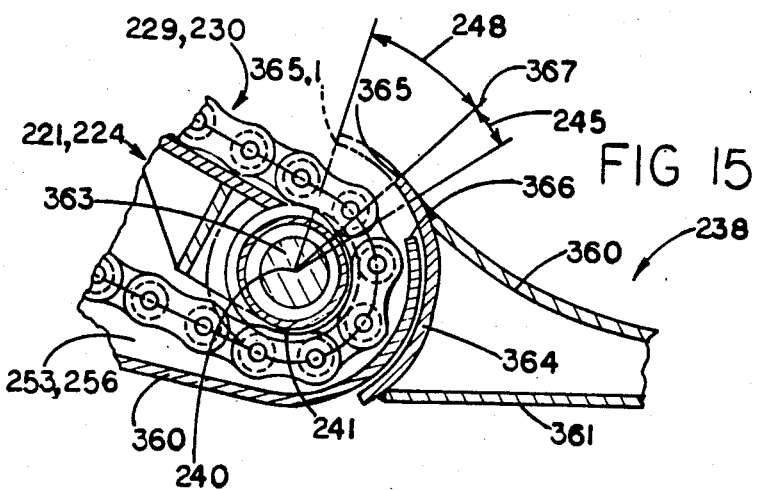
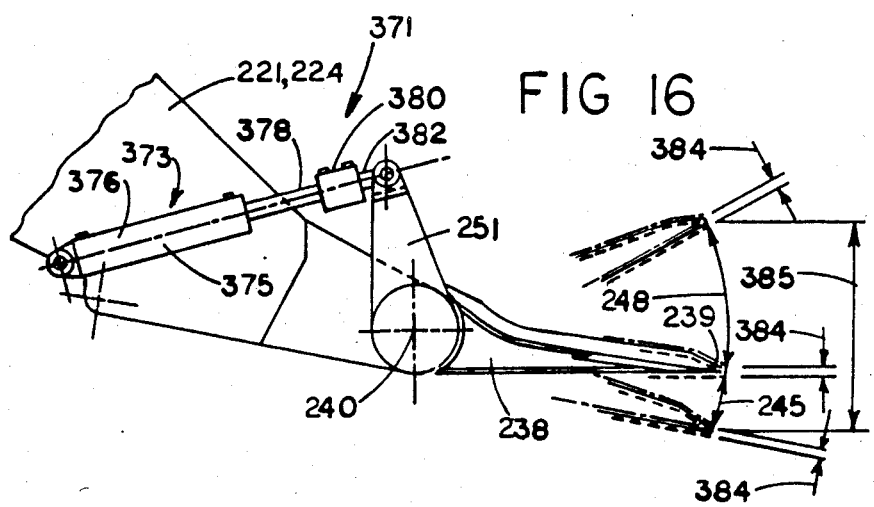

CONTINUOUS LOADING APPARATUS AND METHOD

This is a continuation-in-part of co-pending application Ser. No. 06/326,603 filed on Dec. 2, 1981, now abandoned, and is a continuation-in-part of co-pending application Ser. No. 06/510,765 filed on July 5, 1983 now abandoned.

TECHNICAL FIELD

The invention relates to an apparatus and method for loading loose material onto a conveyor, for subsequent filling of conveyance, particularly for use in underground mines when mucking.

BACKGROUND ART

In an underground exacavation, rock which has been fragmented by blasting is removed from the working area during a "mucking" operation. The rock or muck pile commonly has a steep angle of repose which can be difficult to penetrate by a bucket or other implement used for removing muck. If a loading apparatus carrying the bucket or equivalent utilizes tractive force from ground contacting means, e.g., wheels or crawler tracks, which can be termed mobile mounting means, rapid wear of the mounting means and power train producing the tractive effort results due to scuffing and heavy forces incurred.

Loading apparatus for mucking operations commonly include a conveyor assembly having a gathering device at one end, for example a bucket, a backhoe, gathering arms or a scraper, which is adapted to load material onto a fixed apron or hopper for feeding onto a lower portion of the conveyor. The gathering devices sometimes require a high degree of operator skill, usually suffer from high wear rate and low capacity and, if used with an articulated boom, require considerable head room for operation which can be inappropriate in a low head room mine. The apron of the conveyor assembly is forced into the muck pile by driving the apparatus forward, resulting in the rapid wear of the drive train as outlined above, and also in wear of gathering devices. Commonly, excessive undulations or undesirable gradients of the ground supporting the apparatus, and resilience of tires or suspension result in poor control of the plane of the resulting road bed under the muck heap. The scraper or bucket of the gathering device usually loads the conveyor in a series of discrete feeding strokes interspersed with non-productive recovery strokes, and thus material is fed intermittently onto the apron reducing potential production.

Attempts have been made to reduce the intermittent nature of feeding of material onto the conveyor by use of auxiliary or essentially continuous feeder devices designed to feed material onto the conveyor at a more constant rate than buckets, etc. Some devices use vibrating or reciprocating fingers adjacent the leading portion or apron of the conveyor to loosen material in the muck pile to facilitate entry of the apron or penetrating lip as the conveyor is advanced into muck pile. Many of these devices have an excessive number of parts which are exposed to wear when disturbing a muck pile, and it is felt that they would not be appropriate for material normally encountered in the harsh environment of mucking operations in hard rock excavation. Devices of these general types are shown in U.S. Pat. Nos. 1,855,998 (Shannon); 1,903,672 (Hauge); 1,414,398 (Dennis) and 1,878,037 (Vodoz). Other loading devices having a vibrating trough or plate adjacent the leading portion of the conveyor have been used in coal mining in combination with vibrating or shaking conveyors. The plate is mounted directly on the conveyor to shake therewith, but such devices would be inappropriate in hard rock mining, and furthermore, are limited by a very shallow angle of operation, thus requiring excessively long conveyors to attain a reasonable discharge height onto a waiting conveyance.

SUMMARY OF THE INVENTION

The invention reduces difficulties and disadvantages of the prior art by providing a loading apparatus which enables an oscillating penetrating means at a forward end of a conveyor assembly to be fed essentially continuously into a muck heap for a relatively long working stroke, without the use of complex and separate gathering devices, thus increasing productivity and decreasing maintenance problems. During the working stroke, material from the heap is distributed onto the conveyor in an essentially continuous manner as the conveyor is advanced into the muck heap. If desired, the apparatus can secure itself to stationary surroundings to provide an anchor so that the penetrating means can be forced into the muck pile by forcing or reacting against the anchor, thus eliminating necessity of tractive effort and resulting wear of wheels or crawler track that are usually used.

Alternatively, once the conveyor/penetrating means is situated under the pile, the undulations caused by their interdependent concerted movement will keep the material in the muck pile flowing onto the conveyor. In this instance there is no need to continue to advance the loading apparatus inasmuch as the material will continuously flow, when agitated by the oscillating penetrating means. This effect is especially useful in draw point mucking.

A mobile loading apparatus according to the invention has a body and at least one conveyor assembly mounted on the body. The conveyor assembly is adapted to transport material from a front portion of the conveyor assembly to a rear portion thereof along a longitudinal conveyor axis. The apparatus has advancing means cooperating with the conveyor assembly to cause essentially axial movement of the conveyor assembly as a reaction to force from the advancing means. The apparatus also has penetrating means mounted adjacent the front portion of the conveyor. The penetrating means is adapted to be rotationally oscillated about a horizontal transverse penetrator axis disposed normally to the longitudinal axis to facilitate penetration of the material to be loaded onto the conveyor assembly and to promote flow of material onto the conveyor when the penetrating means is not advancing.

As will be explained in greater detail, the penetrating means and the front portion of the conveyor are specifically disposed about a common or concentric horizontal transverse penetrator axis. This configuration permits controlled undulations under the pile to expeditiously cause the material to flow onto the conveyor. The pile, in effect, behaves as if it were a fluidized bed.

Anchoring means can be provided to cooperate with surroundings adjacent the apparatus to resist reaction to penetration forces generated on the penetrating means. When the advancing means cooperates with the anchoring means to force the penetrating means into the material to facilitate loading of the material onto the conveyor, this penetration is independent of tractive effort from wheels or crawler tracks. The front portion of the conveyor assembly may be hinged to the rear portion for swinging about a horizontal transverse conveyor axis, and preferably forward elevating means extend between the front portion of the conveyor assembly and the body so that actuation of the elevating means swings the front portion about the transverse conveyor axis and raises or lowers the penetrating means.

In one embodiment, in which the mobile mounting means are wheels running on railroad tracks, the anchoring means can be releasably engaged to the rigid structure adjacent the apparatus, e.g., the tracks, and the advancing means extend between the anchoring means and the body so that, when actuated, the apparatus rolls towards the material to be loaded, thus forcing the penetrating means into the material. In a second embodiment which is mounted on endless crawler tracks, the conveyor assembly has a conveyor supporting frame carrying the conveyor, and the supporting frame is movable relative to the body along the longitudinal axis of the conveyor assembly. In the second embodiment, the anchoring means secures the body itself to stationary surroundings, and advancing means moves the conveyor assembly relative to the body. In a third embodiment, a secondary conveyor assembly is fitted below and rearward of the first or primary conveyor to provide a stationary discharge point.

In a fourth embodiment, the apparatus is mounted on endless crawler tracks. Both ends of the conveyor pivot about a discrete point, which is fixed relative to the body.

In each embodiment, the penetrating means is guided in a controlled direction by either the rails carrying the body, the tracks, or the body of the apparatus which supports the conveyor assembly as it moves relative to the body. When the anchoring means is utilized, the force to drive the penetrating means into the muck heap is transferred through the body and anchoring means to the surroundings, and thus scuffing and drive train wear is essentially eliminated. In some embodiments, particular modes of oscillation of the penetrating means can be selected by monitoring loading conditions. If loading conditions are difficult, the penetrating means can be raised so as to penetrate the muck heap at a higher position, thus reducing the load thereon. Also, the conveyor assembly can be mounted for swivelling about a vertical swivel axis to load material disposed to either side of the apparatus.

A method according to the invention is for use with a loading apparatus having a body and a conveyor assembly mounted on the body and adapted to transport material from a front portion of the conveyor assembly to a rear portion thereof along a longitudinal conveyor axis. The front portion has a penetrating means and the method is characterized by advancing the penetrating means into the material to be loaded, and, when required, simultaneously rotationally oscillating the penetrating means about a horizontal transverse axis disposed normally to the longitudinal axis to facilitate loading of material onto the conveyor. This oscillating action occurs because the penetrating means and conveyor components rotate about the common horizontal transverse axis. The method may be further characterized by, when required, prior to advancing the penetrating means into the material to be loaded, anchoring the body relative to the surroundings with anchoring means and forcing against the anchoring means to overcome resistance to penetration of the material. If desired, prior to advancing the penetrating means into the material to be loaded, the method can be further characterized by swinging the conveyor assembly about a vertical swivel axis so as to approach material disposed to either side of the conveyor assembly.

Alternatively, the penetrating means may be placed under the muck pile whereas the apparatus is not advanced. Rather by controllingly oscillating the penetrating means, the material will continuously flow onto the conveyor. This embodiment is especially useful for draw point mucking where the material in the pile is continuously replenished.

DESCRIPTION OF THE DRAWINGS

FIG. 1 is a top plan view of an embodiment of the invention.

FIG. 2 is a side elevation of embodiment shown in FIG. 1.

FIG. 3 is a section taken along line 3—3 of FIG. 2.

FIG. 4 is a section taken along line 4—4 of FIG. 2.

FIG. 5 is a top plan view of an alternate embodiment of the invention.

FIG. 6 is a side elevation of the embodiment shown in FIG. 5.

FIG. 7 is a section taken along line 7—7 of FIG. 6.

FIG. 8 is a section taken along line 8—8 of FIG. 6.

FIG. 9 is a side elevation of an alternate embodiment of the invention.

FIG. 10 is a top plan view of the embodiment shown in FIG. 9.

FIG. 11 is a section taken along line 11—11 in FIG. 9.

FIG. 12 is a side elevation of the embodiment shown in FIG. 9.

FIG. 13 is a section taken along line 13—13 of FIG. 12.

FIG. 14 is a section taken along line 14—14 of FIG. 12.

FIG. 15 is a section of a feature of the invention.

FIG. 16 is a side elevation of a feature of the invention.

PREFERRED MODES FOR CARRYING OUT THE INVENTION

Figure 17:
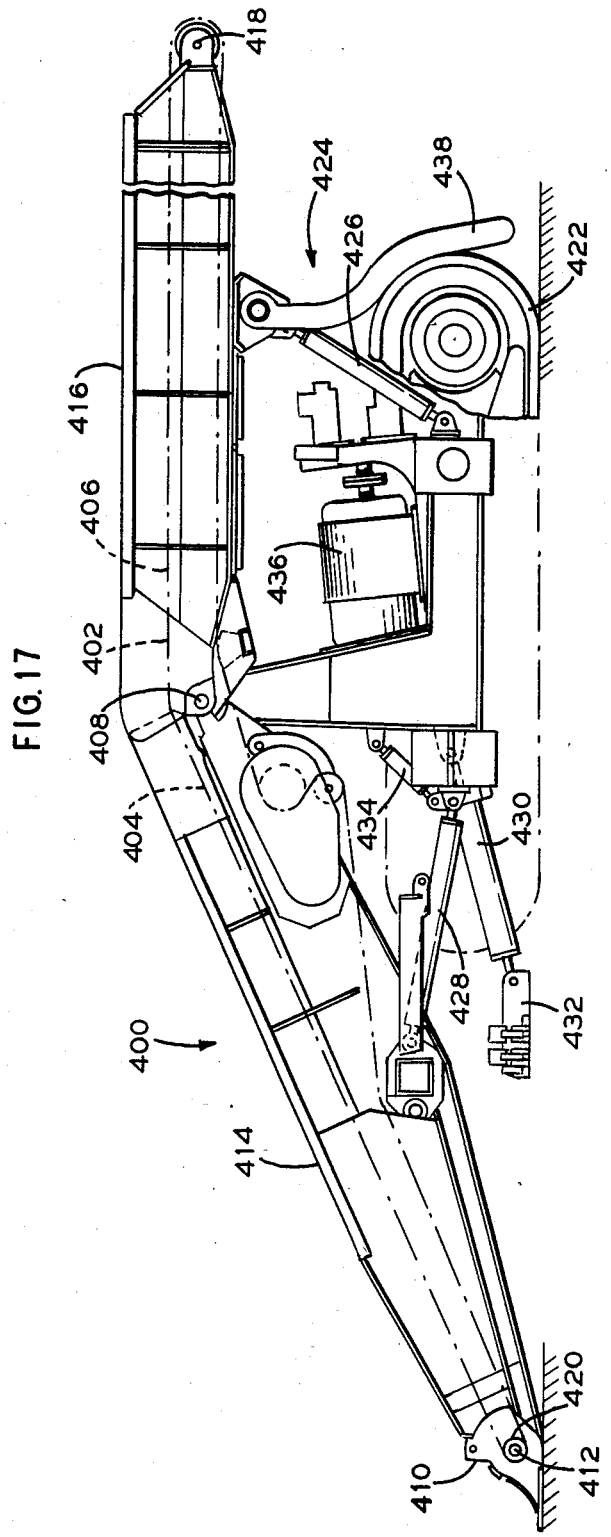
FIG. 17 is an elevation of an alternate embodiment of the invention.

Referring mainly to FIG. 1 and 2, a rail mounting loading apparatus 10 according to the invention is shown supported on a pair of spaced rails 12 or a railroad track carried on a movable rail platform 14 which has a forward end 15. The platform 14, which can be of the type described in Canadian Patent No. 719,987, is supported on the ground 16 and, by known means, is advanced in direction of an arrow 17 towards a muck pile or loose material to be excavated, not shown. The rails are securely fixed to the platform 14 to withstand loader penetration forces as will be described, and if the platform is not used, alternative means of securely fixing the rails to the ground 16 is required.

The apparatus 10 has a body 20 supported on front and rear wheeled bogies 22 and 23 respectively, each bogie carrying two pairs of flanged wheels, severally 25, adapted to engage the rails 12. The wheels 25 and associated bogies serve as mobile mounting means for supporting and permitting movement of the body on a supporting surface, namely the rails. The apparatus has a conveyor assembly 27 mounted on the body and adapted to transport material from a front portion 29 of the conveyor assembly to a rear portion 30 thereof along a longitudinal conveyor axis 32. The conveyor assembly has a conveyor supporting frame 34 which is divided into front and rear conveyor frames 35 and 36 which are hinged together at a horizontal transverse conveyor hinge axis 38. Thus, the front portion of the conveyor assembly is hinged to the rear portion thereof for swinging about a hinge at the hinge axis 38. The conveyor assembly also includes a chain conveyor 40, in which four endless parallel conveyor chains, shown in broken line, extend around front and rear returning members which may be idler sprocket shafts 41 and 42 respectively journalled on the respective conveyor portions, pass over idlers, not shown, and are driven by chain transmission drive means 45 cooperating with the chains as they pass around the rear portion. A chain conveyor is preferred for heavy duty work and steep conveyor angles, but if desired a cleated belt conveyor or other means can be substituted.

For the purposes of the specification, the aforementioned expression "returning member" includes sprockets, idlers, spindles and fixed guiding surfaces around which the conveyor chain or belt 40 revolve. Regardless of the piece of hardware selected, the forward returning member causes the conveyor chain or belt 40 to revolve about the common transverse axis of rotation 53. The penetrating means 50 and conveyor chain or belt 40, via the forward returning member, share the common axis 53.

Parallel elevating cylinders 47 and 48 extend between the front portion 29 of the conveyor assembly and the body 20 and serve as elevating means so that, when actuated, the front portion swings about the transverse conveyor axis 38 and raises or lowers the portion 29. The cylinders 47 and 48 serve as forward elevating means extending between the front portion and structure associated with the rear portion, in this instance the body. A penetrating means 50 according to the invention is hinged adjacent an extreme forward end of the front portion of the conveyor assembly for limited rotation about a horizontal transverse penetrator axis 53 which is disposed normally to the longitudinal conveyor axis 32 and is also concentric with the transverse axis of rotation 53 of the return member (sprocket shaft) 41. The penetrating means 50 is a shallow wedge-like apron or shovel that is forced into the muck pile and has a reinforced penetrator tip 52 to resist wear as it is forced into the muck pile. A similar penetrating means is described in greater detail with reference to FIG. 16. The penetrating means also has upwardly extending arms 57 and 58, and a pair of spaced parallel oscillating cylinders 61 and 62 extend from the arms 57 and 58 respectively to interconnect to brackets 63 and 64 respectively of the front portion. It can be seen that actuation of the oscillating cylinders 61 and 62 acting on the arms 57 and 58 swings the penetrating means from a datum position shown at 66 which is an extension of an upper surface of the conveyor through upper and lower angles 67 and 68 which can be about 85° and 30° respectively. Clearly, the angles 67 and 68 are variable and can be zero, depending on the location of the penetrating means relative to fixed rock and to the front portion 29. The means 50 can also be made to oscillate at particular frequencies through relatively small angles as will be described.

With reference also to FIG. 3 and 4, the body 20 has chassis member 70 and 71 to which the front and rear bogies 22 and 23 are swivellably connected in a normal manner as for rail mounted carriages. The body also has an outer frame 74 connecting the chassis member which carries the conveyor assembly 27 and structure associated therewith. Thus, the outer frame 74 houses a power plant 73 for moving the apparatus along the rail as required, and also for powering the the conveyor assembly 27 and actuating the various hydraulic and electrical components. The member 71 and the bogie 23 are mounted for relative swivelling movement therebetween and are coupled together through a swivel bearing assembly 77 having a swivel axis 78 as seen in FIG. 3. As seen best in FIGS. 1 and 4, a swivel cylinder 79 extends transversely between a central portion 76 of the body 20 and the outer frame 74 and is adapted to swing the outer frame relative to the bogies about the swivel axis 78. The bogie 22 is connected to the central portion 76 of the body 20 by a bogie swivel bearing 80 and cylinder body 81 of the cylinder 79 is connected by trunnion mounts to the portion 76. The chassis member 70 has a plate-like horizontal base with a rectangular opening 69 to accept the central portion 76 therein as a sliding fit. The opening 69 is of sufficient size to provide clearance for relative limited lateral swinging movement of the portion 76. As the combination of the frame 74 and the conveyor assembly 27 is swung about the swivel axis 78, the front portion 29 swings between limits 29.1 and 29.2 and the rear portion 30 swings between limits 30.1 and 30.2 as shown in FIG. 1. If necessary, stablizers, not shown, can be provided to extend downwardly from outer portions of the frame 74 to engage the ground to prevent over turning of the apparatus when the upper portion approaches the limits of swinging relative to the chassis. Thus, it can be seen that the conveyor assembly is mounted on the body for limited lateral swinging about an essentially vertical swivel axis so as to permit collection of material disposed to either side of the front portion conveyor when in a central position.

An advancing cylinder 82 has a cylinder upper end connected to a bracket 83 connected to the chassis 70, and an extensible and retractable piston rod 84 connected to a releasable rail clamp 85 which can be clamped onto an adjacent rail platform structure. Any clamp of sufficient gripping force can be used, and is preferably operated remotely. A lift cylinder 88, broken outline, extends between the advancing cylinder 82 and the body so as to raise the rail clamp 85 when required, so as to avoid interference with obstructions adjacent the ground, and structure associated with the rail when the apparatus 10 is mobile. A similar advancing cylinder 90, and respective lift cylinder, not shown, are provided on an opposite side of the body to engage the opposite rail or equivalent with a similar rail clamp 91. The advancing and lift cylinders are connected to respective structure through partial universal joints or equivalent to permit limited lateral and vertical swinging of the cylinders.

It can be seen that, when two rail clamps are clamped on appropriate rails and the advancing cylinders 82 and 90 are retracted, the apparatus 10 is moved in direction of the arrow 17 so that the penetrating means 50 is forced into the muck pile, and as will be described, when the means 50 is oscillated, material is fed at relatively low energy requirements onto the conveyor. The apparatus is thus moved forwardly independently of tractive effort from the wheels, and thus the wheels could freewheel while the advancing cylinders are actuated, thus eliminating scuffing and drive train wear. It can be seen that the rail clamps 85 and 91 serve as anchoring apparatus, that is to releasably engage rigid structure, i.e., the rails, so as to resist reaction to penetration forces generated on the penetrating means, or in other words, to permit the advancing means to force against the anchoring means to drive the penetrating means into the muck pile. The advancing cylinder 82 and 90 are seen to be extensible and retractable means extending between the anchoring means and the body and serve as advancing means cooperating with the anchoring means to force the penetrating means into the material to be transported onto the conveyor, but equivalent advancing means could be substituted. In this particular instance, the wheels are adapted to run on tracks, preferably on a movable rail platform, and the anchoring means is a releasable rail clamp adapted to engage at least one of the rails or tracks, but clearly, equivalent wheels and complementary tracks, or equivalents can be substituted, with other means to permit the anchoring means to engage non-moving or rigid surroundings.

In operation, referring mainly to FIGS. 1 and 2, the movable rail platform 14 is positioned so that the forward end thereof 15 is closely adjacent the muck pile, and the apparatus 10 moves, for example by power applied to the wheels 25, so that the front portion 29 extends beyond the end 15 to be close to the muck pile. The elevating cylinders 47 and 48 are actuated so that a lower surface of the penetrating means 50 is closely adjacent the ground 16 so that the penetrating means 50 can approach a lower portion of the muck heap. The advancing cylinders are extended to full extension and the respective lift cylinders are actuated to position the rail clamps 85 and 91 over the appropriate rail 12, the rail clamps then being actuated so that they grip the rails 12. The advancing cylinders 82 and 90 are retracted equally, thus forcing the penetrating means 50 into the muck heap, and pushing material onto the conveyor assembly. As resistance to penetration increases, the operator can rotationally oscillate the penetrating means about the penetrator axis 53, i.e., by swinging the penetrating means up and down through the angles 67 and 68 which assists in penetration. If excessive resistance to penetration is met, the front portion 29 can be raised by extending the elevating cylinder 47 and 48, so that the penetrating means penetrates the muck heap at a higher elevation, thus reducing load on the penetrating means and facilitating entry. Material disturbed by oscillations of the means 50 flows onto the conveyor and is moved upwardly along the portion 29 onto the portion 30 from where it is discharged into a waiting conveyance, not shown, from a rear end of the rear portion 30. The rear end of the conveyor assembly sweeps over the conveyance during the stroke of the advancing cylinders and distributes material generally evenly in the conveyance. When the cylinder 82 and 90 are fully retracted, the advancing ceases. The rail clamps are released and the advancing cylinders 32 and 92 are actuated to reposition the rail clamps in a more forward position, and the rail clamps are again actuated to grip and the cycle is repeated.

The oscillations permit the tip of the penetrating means 50 to penetrate into the muck heap in an essentially continuous manner, thus producing an essentially continuous stream of material falling onto the conveyor assembly and essentially eliminating the intermittent feeding of material onto the conveyor assembly which is inherent in prior art apparatus using scrapers, buckets, etc.

By virtue of the interdependent, concentric configuration of the penetrating means 50 and returning member (sprocket shaft) 41, which may rotate about the common axis 53, the operator has a degree of flexibility unmatched by previous systems utilizing other configurations. By forcing the penetrating means 50 under the heap and then oscillating penetrating means 50, the muck pile behaves like a fluidized bed. The rock is continuously disturbed and gravitates to a reduced angle of repose. As the angle of repose is continuously being reduced by the fluctuating action of the penetrating means 50, the muck easily flows onto the conveyor 40. The forward portion 29 of the conveyor assembly 27 and the penetrating means 50 may be undulated in tandum by cylinders 47, 48 and 61, 62 via the common transverse axis 53.

If the cylinders 47 and 48 are not actuated to raise the penetrating means 50, the means 50 follows a path dependent on inclination of the rails and this improves control of the angle of the resulting bed.

By maintaining the penetrating means 50 in a down position, parallel to the ground (as in FIG. 2), a flat road bed will result as the apparatus 10 is progressively moved along.

The penetrating means 50 can be oscillated at an optimum frequency, or a combination of frequencies as will be described with reference to FIG. 16, and the penetrating means can be raised as required to enhance material removal without use of the power train or scuffing of the wheels and rails. A typical range of frequencies may be between ten and several thousand cycles per minute for a total amplitude swing of between zero and thirty degrees, or alternatively a maximum total tip displacement of about twenty or thirty centimeters. It would be usual to combine the higher frequency with the smaller amplitude and vice versa.

A second embodiment loading apparatus 130 (FIGS. 5 and 6) differs from the loading apparatus 10 of FIGS. 1 through 4 by substituting a crawler means 132 for the wheels 25 and railroad track 12. Also because the crawler tracks 132 can be positioned relatively easily on the ground 131, the swivelling conveyor assembly of FIGS. 1 through 4 may be replaced with a non-swivelling alternative conveyor assembly 134, which also has other differences as will be described. The apparatus 130 has a body 135 mounted on the crawler tracks 132 and a plurality of roller bearing assemblies 137 which support the conveyor assembly to permit longitudinal movement of the conveyor assembly as will described with reference to FIG. 7. The conveyor assembly 134 has a longitudinal conveyor axis 133 and a conveyor supporting frame 129 having front and rear portions 139 and 140, the front portion being hinged to the rear portion for swinging about a horizontal transverse conveyor hinge axis 142. The rear portion 140 is carried on a longitudinal rail or ram means 141 complementary to the bearing assemblies 137 as will be described with reference to FIG. 7. The ram or rail means 141 is mounted in the bearing assemblies 137 which serve as a complementary ram socket or linear bearing guide means 148. The resulting combination of ram and socket permits longitudinal movement of the conveyor supporting frame in direction of an arrow 144 from a retracted or rearmost position of the conveyor assembly as shown, to a foremost or extended position of the conveyor assembly, not shown. An extended position of an equivalent ram means of a third embodiment is shown in FIG. 12, and will be described later. The body contains a suitable motor and hydraulic pumps, and other known equipment for driving the crawler tracks, and for operating various hydraulic and electrical equipment as will be described.

The body 135 carries a pair of parallel conveyor advancing cylinders 146 and 147 which extend between the body and the ram means 141, which is secured to and thus is effectively part of the rear portion 140 of the conveyor assembly. Thus, from the position shown in FIG. 6, actuation of the cylinders 146 and 147 advances the conveyor assembly axially in direction of arrow 144 so that the forward portion 139 attains a position 139.1 when the advancing cylinders are fully actuated. The rear portion 140 moves with the front portion 139 and moves along the body until an extreme rear end 151 of the portion 140 becomes close to a rear end of the body. A rear elevating cylinder 149 extends between a rear portion 150 of the ram means 141 and the rear portion 140, and can raise the rear portion to a raised position 140.1, as shown in FIG. 6 to provide clearance for the end 151 of the conveyor over a conveyance, not shown, which can be positioned to receive material falling from the conveyor. Thus, the rear portion is adapted for swinging about the conveyor hinge axis 142 and, because the cylinder 149 is mounted on the ram means 141, it can accomodate the longitudinal sliding of the rear portion when the advancing cylinders 146 and 147 are actuated.

Referrring also to FIG. 7, which shows one side of the rear portion 140, one typical bearing assembly 137 of the several on each side is described. The assembly 137 of the several on each side is described. The assembly 137 has upper and lower horizontally-journalled rollers 136 and 138 which sandwich the ram or rail means 141 therebetween, adjacent horizontal surfaces of the means 141 being hardened tracks which are engaged by the rollers to permit longitudinal movement and to prevent vertical movement of the rear portion 140. A vertically journalled roller 143 engages an outer vertical face of the means 141 to prevent lateral movement of the rear portion 140. The rollers 136, 138 and 143 are mounted on eccentrics to permit fine adjustment of the rollers relative to the means 141 to control lost motion and accomodate wear, and a dust seal 145 sweeps a face of the rear portion 140 to reduce bearing contamination. A series of similar bearing assemblies 137 are mounted on each side of the body 135 and are also spaced along the body to support the rear portion in all positions and thus provide the linear bearing 148 which provides the ram socket for mounting ram means 141.

Referring mainly to FIG. 6, a penetrating means 152 is mounted adjacent the front portion 139 and is hinged adjacent an extreme forward end of the front portion for limited rotation about a horizontal transverse penetrator axis 154 disposed normally to the longitudinal axis 133 of the conveyor. The means 152 has a penetrator tip 156 which is reinforced to reduce wear when forced into a muck pile during mucking and is similar to the means 50 FIG. 1. A pair of spaced oscillating cylinders 57 and 158 extend between brackets secured to the forward portion 139 and respective arms 159 and 160, which arms extend upwardly from the penetrating means. In a manner similar to that as described with reference to FIGS. 1 through 4, actuation of the cylinders 157 and 158 swings the penetrating means about the concentric transverse axis 154 through an arc shown by the undesignated arrows. A pair of parallel elevating cylinders 163 and 164 extend between the front portion 139, and a forward portion 161 of structure movable with the ram means 141, so as to swing the front portion about the axis 142. The conveyor and, for convenience, the combination of the complete conveyor assembly 134, the ram means 141, the penetrating means 152 and the cylinders 149, 157, 158, 163, 164 is termed an excavating assembly which is movable "en masse" relative to the body 135 in response to actuation of the cylinder 146 and 147.

When the rear portion 140 is in a rearmost position as shown, extension of the elevating cylinders 163 and 164 swings the front portion from a retracted lowered lowered position, shown in full outline and designated 139 in FIG. 6, to a retracted raised position, shown in broken outline and designated 139.2, in which the penetrating means is in a similar retracted raised position 152.2. However, if the advancing cylinders are actuated when the front portion is lowered, the front portion and means 152 assume extended lowered positions 139.1 and 152.1, broken outline, from which when the front portion is raised, the front portion assumes an extended raised position 139.3, shown in broken outline.

The body 135 has two operator positions 166 and 167 provided with necessary duplicate controls. The operator position 166 can be used when the apparatus is being moved, i.e., when positioning the apparatus prior to mucking, and the position 167 is used primarily when loading or as desired. The body 135 has a pair of laterally extensible rams 171 and 172, which are shown in broken outline in an extended position in FIG. 5 so as to contact portions of rock face 174 defining opposite side walls of the tunnel so as to essentially prevent movement of the body during mucking. The body 135 also has a pair of longitudinally extensible support legs 177 and 178 which are adapted to extend downwardly from a rear portion of the body to an extended position as shown in broken outline in FIG. 6. As shown in FIG. 8, the support legs extend from a transverse beam 180 adjacent the rear of the body 135 and, if required, a similar transverse beam, not shown, can be mounted adjacent the front of the apparatus and second pair of support legs, not shown, can be fitted.

In operation, the loading apparatus 130 functions similarly to the apparatus 10 of FIGS. 1 through 4, with the exception that the anchoring means, namely the laterally extending rams 171 and 172, and if required the legs 177 and 178, secure the body 135 to adjacent fixed structure, i.e., the adjacent rock, and thus the body itself does not move while penetrating means and conveyor is advanced into the muck pile. This contrasts with the previous embodiment where the whole apparatus, with the exception of the anchoring means, moves as the penetrating means is advanced into the muck pile. Similarly to the first embodiment, in the second embodiment the advancing means, i.e., the cylinders 146 and 147, cooperate with the conveyor assembly to cause essentially axial movement of the conveyor assembly as a reaction to force from the advancing means which is independent of tractive effort from the wheels.

A typical sequence of operation for the apparatus 130 is as follows. The operator, in the position 166, actuates the crawler tracks 132 until the penetrating means 152, in the lowered retracted position as shown in full outline in FIG. 6, is closely adjacent the muck pile. If heavy mucking is expected, the laterally extending rams 171 and 172 are extended to engage to rock wall 174, and if inclination of the body requires adjusting, the support legs 177 and 178 are extended, independently from each other, as required, to position the linear bearing 148 of the ram socket at the desired inclination relation to the ground 131. The operator then assumes the position 167 and actuates the advancing cylinders 146 and 147, with the penetrating means 152 positioned closely adjacent the ground, that is, the front portion 139 is lowered as shown in FIG. 6. As the advancing cylinders move the conveyor assembly 134 forwardly, the penetrating means advances into the muck pile, and when a particular resistance to penetration is felt, the oscillating cylinder 157 and 158 are actuated so as to extend and retract at a particular frequency, which rotationally oscillates the penetrating means 152 about the axis 154 to faciliate penetration into the muck pile. Note how the returning member and the penetrating means 152 are disposed about the same common axis 154. As the penetrating means advances further into the muck pile, and additional resistance is experienced, if necessary, the elevating cylinder 163 and 164 can be extended to raise the front portion 139, so that the penetrating means describes a higher path through the muck pile, thus reducing load on the penetrating means. Muck flows down onto the conveyor, to pass up the forward portion 139, along the rear portion 140 and is discharged from the back of the rear portion 140 onto a waiting conveyance, not shown. The portion 140 moves axially, and thus distributes material axially into the waiting conveyance.

When the advancing cylinders reach the end of their stroke, the penetrating means is activated so as to essentially empty material off the penetrating means. The advancing cylinders are then retracted so that the conveyor assembly moves rearwardly and the front portion is again lowered to assume full outline position shown in FIG. 6. The above cycle is repeated as needed until at least a portion of the muck pile is essentially removed, the body remaining stationary throughout to relieve the power train of wear. The laterally extending rams and advancing cylinders are then retracted and the crawler tracks are actuated to move the apparatus 130 forwardly, so as to position the penetrating means closely adjacent remaining portions of the muck heap once again. The laterally extending rams 171 and 172 and the support legs 177 and 178 are extended to lock and position the body as required.

Thus, it can be seen that the laterally extending rams serve as anchoring means mounted on the body and adapted to extend outwardly therefrom to engage an adjacent surface of the surroundings to prevent movement of the body relative to the surface. Thus the rams are adapted to cooperate with the surroundings adjacent the apparatus to resist reaction to penetration forces generated on the penetrating means. Also, the conveyor advancing cylinders 146 and 147 serve as the advancing means, equivalent to the advancing cylinders 82 and 90 of FIG. 1, and in fact are extensible and retractable means extending between the body and the conveyor assembly to move the conveyor assembly towards the material yet to be loaded. The elevating cylinders 162 and 164 are equivalent to the cylinders 47 and 48 of FIG. 1 and serve as forward elevating means extending between the front portion of the conveyor assembly and structure associated, with the rear portion, which in this instance is the ram means, so that actuation of the elevating means swings the front portion about the transverse conveyor axis and raises or lowers the penetrating means. Thus the horizontal transverse conveyor hinge axis permits relative swinging between the front and rear portions of the conveyor, which occurs when either, or both, portions are raised or lowered. Also, the oscillating cylinders 157 and 158 and associated structure are equivalent to the cylinders 61 and 62 and associated structure of FIG. 1, and serve as oscillator means cooperating with the penetrating means to oscillate the penetrating means about the common horizontal transverse penetrator axis.

It can be seen that a method of loading material according to the invention is for use with an apparatus having a body and a conveyor assembly mounted on the body and adapted to transport material from a front portion of the conveyor to a rear portion thereof along a longitudinal conveyor axis. The front portion has a penetrating means and the method is characterized by: advancing the penetrating means into the material to be loaded, and, when required, simultaneously rotationally oscillating the penetrating means about a horizontal transverse axis common with the return member of the conveyor and disposed normally to the longitudinal axis to faciliate loading of material onto the conveyor. To overcome resistance to penetration, prior to advancing the penetrating means into the material to be loaded, an anchoring means is anchored relative to the surroundings and is forced against it to overcome the resistance to penetration of the material. In the first embodiment, after the anchoring means is anchored relative to the surroundings, the remainder of the apparatus is moved by advancing means relative to the anchoring means, thus forcing the penetrating means into the muck heap. In a second embodiment, the body may be anchored relative to the surroundings and the conveyor assembly is moved forwardly relative to the body to advance the penetrating means into the muck heap.

A third embodiment 210 of the invention differs from the two previously described embodiments by providing a secondary conveyor assembly which remains fixed during one complete stroke of the penetrating means. Similarly to the second embodiment herein, the conveyor assembly carrying the penetrating means moves relative to a fixed body during the complete stroke and is a portion of an equivalent excavating assembly as will be described.

The third embodiment 210 of the invention (FIGS. 9-14) has a supporting body 212 carried on forward and rear pairs of wheels 214 and 215 respectively. Each wheel is swivellable about an essentially vertical axis as shown in FIG. 10 to permit conventional steering, steering in which the vehicle moves both longitudinally and laterally simultaneously so as to maintain longitudinal axis 219 of the vehicle at a constant angle to a datum, which steering sometimes referred to as crab-like steering. The apparatus has an operator's seat 217 provided with controls to control, amongst other things, an electrical power unit 218 for use at an excavation face and area where exhaust, heat or noise produces problems. A separate power unit 216, which is typically an internal combustion engine, is for use where exhaust, etc., are not problems. Alternatively the apparatus can be powered by other sources of power.

The apparatus has primary and secondary conveyor assemblies 221 and 222 respectively, the 222 having front and rear portions 227 and 228. The conveyor assemblies are disposed along the longitudinal axis 219 so that the portion 225 of the primary conveyor assembly is disposed above the forward portion 227 of the secondary conveyor assembly to permit material to fall from the primary to secondary conveyor assemblies. The primary conveyor assembly has an inclined chain conveyor 229 having four chains 230 connecting a plurality of flights, some of which are shown in broken outline, the conveyor 229 being similar to those conveyors as commonly used in mucking operations. The chain conveyor 229 has a width 231 which is considerably wider than width 232 of the secondary conveyor assembly, which has a belt conveyor 233 as commonly used in mines for transporting muck. Both conveyors pass through conveyor drive means so that upper surfaces of the conveyors move rearwardly in a general direction of an arrow 237. The front or forward portion 224 is inclined at an angle 235 about 15%, and the rear portion 225 is inclined at a shallower angle 236, typically between 1° and 5°. Thus material moving up the primary conveyor is subjected to a rapid climb initially on the forward portion to reduce length of the conveyor, and is then transported essentially horzintally on the portion for discharge onto the forward portion 227 of the secondary conveyor assembly below, the discharged material being guided by an inclined tapering funnel 234.

A penetrating means or penetrator 238 has a forward tip 239 and is mounted adjacent the forward portion 224 of the primary conveyor assembly for swinging about a transverse penetrator axis 240 disposed horizontally and normally to the longitudinal axis 19 in the top plan view of FIG. 10. The penetrator axis is coincident with an axis of a forward returning member (conveyor sprocket shaft) 241 and permits the penetrating means to swing through an arc 242 from a horizontal datum position as shown in full outline to a downwardly inclined position 244 disposed to the horizontal at an angle 245, about 10°, through to an upwardly inclined position 247 disposed to the horizontal at an angle 248 about 30°. For some applications the angle 245 could be equal to the angle 248, i.e., about 30°. A pair of penetrator moment arms 251 and 252 extend from an inner portion of the penetrating means to serve as coupling means 250 which cooperate with respective hydraulic penetrator actuating cylinder 254 and 255 respectively which have opposite ends cooperating with side member 253 and 256 of the primary conveyor assembly. Each hydraulic cylinder thus has a first portion cooperating with the primary conveyor assembly and a second portion cooperating with the coupling means. It can be seen that actuation of the penetrator cylinders 254 and 255 swings the penetrating means through the angles 245 and 248 as required to faciliatate loading and are thus equivalent to the oscillating cylinder as previously described.

The apparatus also includes a ram member 258 extending rearwardly and axially from a primary conveyor assembly 260, which supports a forward end of the portion 225 and a rear end of the portion 224 of the primary conveyor assembly. The body 212 has a ram socket 262 which is complementary to the ram member and is adapted to receive the ram member therein. The socket is mounted on the body so as to be disposed generally axially, that is along the lonitudinal axis 219, and horizontally as viewed in the side elevation of FIG. 9. As will be described with reference to FIG. 13, the ram member and ram socket are generally rectangular in cross-section and provide a sturdy support for ensuring axial movement of the ram member and primary conveyor assembly as will described. As best seen in FIGS. 10 and 12, the ram member has forward rear ends 264 and 265, with spaced parallel primary conveyor elevating cylinders 267 and 268 connected at the forward end 264, and a ram actuating cylinder 269 connected at the rear end 265. The primary conveyor support 260 also extends upwardly from the forward end 264 of the ram member to an upper hinge pin 276 to which is connected to the forward portion 224 of the primary conveyor to permit swinging thereabout relative to a conveyor hinge concentric with the pin 276. Thus the support 260 supports adjacent portions of the primary conveyor assembly at the conveyor hinge. The elevating cylinders 267 and 268 extend to the side members 253 and 256 of the forward portion 224 remote from the hinge pin 276 so that extension of the elevating cylinders 267 and 268 swings the forward portion 224 about the pin 276 through an arc 278 to an uppermost position 279, shown in broken outline in FIG. 9 only, in which the forward portion 224 is essentially horizontal. Thus the forward portion 224 is hinged to the rear portion 225 to permit relative swinging therebetween about the hinge 276 and the cylinder 267 and 268 serve as elevating means which cooperate with the forward portion 224 and the ram member to swing the portion 224 relative to the portion 225 to vary height of the transverse axis 240. When the forward portion 224 is in the uppermost position 279 and the penetrating means 238 is fully elevated relative to the portion 224, the tip 239 of the penetrating means assumes an uppermost position 281 which is the highest portion of the apparatus. The ram actuating cylinder 269 has an inner end 283 secured adjacent a rear portion of the body 212, and an outer end 284, i.e., an end of the piston rod thereof, secured to the rear end 265 of the ram member 258 so that actuation of the ram actuating cylinder moves the ram member axially along the ram socket. Other telescoping means equivalent to the ram cylinder are known and all serve as an advancing means to move the primary conveyor assembly.

As best seen in FIG. 14, a conveyor supporting frame 282 of the rear portion 225 of the primary conveyor assembly 221 has a pair of parallel side members 285 and 286, each member having first guide means 287 extending along both sides of the conveyor. The body 212 has an upper support 288 having a second guide means 287 of the primary conveyor assembly to permit essentially axial movement between the conveyor assemblies 221 and 222 and also to support the rear portion 225 of the primary conveyor assembly above the secondary conveyor assembly. Thus, extension of the ram member 258 produces concurrent forward movement of the forward portion 224 and the rear portion 225 of the assembly 221. Thus, it can be seen that the ram socket and second guide means, which are both fixed and carried on the body 212, support the ram member 258 and rear portion 225 of a movable excavating assembly 291 which includes the complete primary conveyor assembly 221, the penetrating means 238, the primary conveyor support 260, the penetrator cylinders 254 and 255 serving as oscillating means, the elevating cylinders 267 and 268 serving as elevating means, and the ram member 258 serving as extension means. This total excavating assembly is movable "en masse", i.e., all together as one connected assembly, relative to the body and this permits the penetrating means 238 to be forced into a muck heap at a particular angle while the body 212 and secondary conveyor assembly remain stationary.

Thus, in summary the excavating assembly is supported on the extension means which extends forwardly from the body and supports the primary conveyor assembly to permit essentially axial movement between the primary and secondary conveyor assemblies. The extension means includes the ram means cooperating with the primary conveyor assembly and the body to permit longitudinal axial sliding movement of the primary conveyor relative to the body so that the penetrating means is forced into the material, the ram means concurrently supporting the forward portion of the primary conveyor. The excavating assemblies 165 of FIG. 5 and 291 of FIG. 12 are essentially equivalent and permit movement of of the penetrating means relative to a fixed body.

The wheels 214 and 215 or equivalents such as tracks serve as mobile mounting means to support the body for movement as described for positioning the apparatus relative to the muck heap. For mucking operations, it is preferable to provide a rigid anchored base for the body 212 and eliminate resilience effect of the tires and suspension by raising the body to relieve weight from the wheels during the mucking operation, and to provide forward movement for the penetrating means by extending the excavating assembly 291 as described. Such raising is accomplished by providing first and second pairs 293 and 294 of extensible support legs adjacent the forward and rear portions of the body respectively. These legs are generally similar and are fitted in complementary guides in the body and are provided with internal hydraulic rams, not shown, to extend downwardly from the body to engage the ground, and if extended sufficiently will lift the wheels completely off the ground. Each extensible support leg is independently adjustable so as to vary inclination of the body relative to the surface, which would correspondingly vary a path of extension or sweep of the ram member 258, so as to accomodate terrain or other variables in the mine. In this way, when the body 212 is set by the legs in a desired attitude, the ground under the muck heap can be scraped by the penetrating means 238 in a desired plane thus producing a final road bed of desired inclination. This reduces the irregularities in the final road bed that are commonly produced by prior art machines, some of which excavate while being supported on tires or tracks, where suspension resilience or irregularities in the existing road bed reduce control of a scraper or equivalent. Clearly, in prior art machines where a scraper, etc. extends or overhangs considerably forwardly from wheels or tracks, any unevenness in the existing road bed is magnified at the scraper due to the overhang effect. Thus, weight is relieved, or completely eliminated from the mobile mounting means and reaction to thrust on the excavating assembly 291 is resisted by the four legs. In FIG. 12, one leg of the first pair 293 is shown extended in broken outline and has a point to engage the ground to resist mucking forces to serve as anchoring means.

A pair of similar laterally extensible rams 297 and 298 are mounted adjacent a rear portion of the body 212 and have axis of extension and retraction 299 and 300 which are inclined at equal acute angles 302 and 303 to the longitudinal axis, typically about 80°. The ram assemblies have extensible portions 304 and 305 having outer ends adapted to contact side walls of the mine opening where feasible at an acute angle relative to the longitudinal axis 219 as best seen in FIG. 10. An acute angle of contact with the side walls is preferred because the force from mucking is in direction of the arrow 237 and it can be seen that the acute angle of the rams contacting the walls resists slipping more effectively than if the rams were at right angles to the wall. Thus, the apparatus includes a first pair of extensible rams which are mounted on the body and, where appropriate, are adapted to extend generally laterally and horizontally from the body to engage adjacent oppositely facing surfaces to augment restraint of the apparatus against movement, and thus serve as anchoring means.

A pair of similar upwardly extensible rams 308 and 309 are mounted on opposite sides of the body adjacent the rear portion thereof and, where appropriate, are adapted to extend generally upwardly to engage an upper surface above the apparatus, i.e., the roof of the mine opening which is not shown. The ram 308 is mounted on a knuckle joint 310 at a lower end thereof to permit swinging of the ram within a partially conical envelope 311 so as to vary angle of contact of the ram with the surface with which it is engaged. A swing cylinder 312 extends between the body 212 and the ram to control angle of the 308. When the first and second pairs of legs 293 and 294 are extended, followed by extension of the rams 308 and 309, the body 212 is securely restrained within the mine opening. Thus, extension of the rams augments restraint of the apparatus against movement by increasing load on the means bearing weight of the apparatus, in this case, the first and second pairs of legs 293 and 294, to serve as additional anchoring means.

Turning to FIG. 13, the ram member 258 and ram socket 262 are generally symmetrical about the axis 219, not shown, and thus one portion only will be described. The ram member 258 has a generally rectangular box section having four plate members, three only of which are shown, namely parallel upper and lower plate members 321 and 322 and a vertical plate member 323 extending between the member 321 and 322. The members 321 and 322 extend outwardly beyond the member 323 and are provided with wear strips or rails 325 and 326, respectively, which straddle a ram guide roller 329 fitted between the wear strips. The ram socket 262 has upper and lower wall members 331 and 332 which are connected by a side member 333 carrying an inwardly extending spindle 334 which journals the roller 329 thereon, the spindle having a lubrication passage 335 to lubricate the roller 329. Opposite sides of the ram member and ram socket are similar and it can be seen that the considerable loads existing between the ram member and ram socket are carried on the wear strips and respective rollers. At least four pairs of the ram guide rollers 329 are fitted in the socket to support and guide the ram member as it extends and are also shown in broken outline in FIGS. 9, 10 and 12. The rollers and rails are defined as roller means to mount the ram for axial movement relative to the ram socket.

Referring to FIG. 14, the primary conveyor assembly 221 and respective supports are generally symmetrical about the axis 219, not shown and thus one portion only will be described. The rear portion 225 of the assembly 221 has a rear support spindle 341 extending non-rotatably between the side members and and journaling thereon a rear conveyor sprocket between the side members and journaling thereon a rear conveyor sprocket shaft 343 carrying a conveyor sprocket 344. The spindle 341 has an outer end adjacent the side member 285 journaling conveyor guide roller 347 thereon. The support 288 of the body 212 has a grooved side wall 352 having upper and lower wear surfaces or rails 353 and 354 which straddle the guide roller 347. Thus, the guide roller is restrained against vertical movement to resist forces imparted to the primary conveyor assembly during mucking, etc., but is free to move axially as the conveyor assembly 221 extends. An opposite end of the spindle 341 is similar and thus it can be seen that conveyor guide rollers 347 serve as the first guide means 287 for the rear portion of the primary conveyor assembly, and the grooved side walls and rails serve as the second guide means 289 of the body to engage the first guide means. The guide rollers and rails are defined as roller means associated with the first and second guide means to mount the primary conveyor assembly for movement relative to the supporting body.

In reviewing FIGS. 15 and 16, it will be noticed that the numbering system relates to the embodiment shown in FIGS. 9 and 10. However, it should be appreciated that the concepts and configurations depicted in FIGS. 15 and 16 may be applied to all the described embodiments and to the variations thereof.

Turning now to FIG. 15, the penetrating means 238 has upper and lower plates 360 and 361 secured together by an inner concave wall 364 and side walls, not shown, so as to form a closed box-like assembly. A lower member 360 extending between the side member 253 and 256 of the forward portion 224 terminate at an upwardly curved lip 366 which, similarly to the wall 364, is concentric with the common penetrator axis 240 and axis of the returning member 241 of the primary conveyor. One of the conveyor chains 230, connected to the flights, not shown, for transporting material up the primary conveyor, passes around an idler or sprocket, not shown, mounted on the conveyor shaft 241 which is hollow and encloses a fixed spindle 363 which journals the shaft 241 and the penetrating means 238. An upper edge 365 of the concave wall 364 is shown in a datum position designated 367 in which the lower plate 361 is horizontal, and the angles 245 and 248 represent maximum downward and upward ranges of movement of the penetrating means relative to the datum. Clearly, when the edge 365 is in an uppermost position, shown in broken outline 365.1, there is sufficient clearance to prevent interference with the chain. Likewise, in the lowermost position of the penetrating means, not shown, the upper edge 365 is no lower than the lip 366 of the undersurface 360. This is to direct muck relatively smoothly onto the conveyor and also to reduce ingress of muck between the frame and the chain 230. The penetrating means of the various embodiments are generally similar to the means 238.

In operation, the third embodiment functions generally similarly to the second embodiment 130 as follows.

The apparatus 210 with a retracted ram cylinder, moves into a postion adjacent a muck heap and drives the penetrating means disposed in the datum position into the muck heap until resistance to penetration is such that the tires are close to the limit of adhesion. The apparatus is stopped and the first and second pairs of legs 293 and 294 are extended downwardly from the body so as to provide a positive restraint of the body against movement, and to position the penetrating means 238 in a desired attitude to produce a desired final road bed. If adjacent surfaces are suitable, the laterally extensible rams 297 and 298, and the upwardly extensible rams 308 and 309 are also extended to augment restraint. The ram actuacting cylinder 269 is then extended so as to force the excavating assembly 291 forwardly from the position shown in FIG. 9 towards the position shown in FIG. 12. The penetrating means is set so as to be generally horizontal to aid oenetration, but it can be inclined to accomodate the muck pile characteristics. Also the elevating cylinders 267 and 268 are retracted as required initially so that the penetrating means 238 is at its lowermost position, but the forward portion 224 can be raised by extending the cylinders 267 and 268 if the muck heap is excessively high or resistant to penetration. When the operator feels a particular crowding force is attained, or the rate of ram cylinder extension or loading of material becomes too slow, the penetrator oscillating cylinders 254 and 255 are actuated so as to produce suitable rotational oscillations of the penetrating means as previously described. As the penetrating means moves into the muck pile, if the elevating cylinders remain inactive, the penetrating means follows a desired path which is dependent on inclination of the ram socket, and is independent of surface undulations and resilience of the suspension because the supporting legs 293 and 294 carry the body while the ram means extends. After a full stroke of the ram cylinder into the muck pile, the apparatus can be repositioned, if needed, following retraction of the ram cylinder and anchoring means, by moving forwardly to approach the diminished muck heap. The cycle of operation is then repeated, after the receiving conveyance is also moved to follow the rear portion of the secondary conveyor as before.

Each of the various embodiments shown have different mobile mounting means, for example, railroad wheels of the first embodiment, endless crawler tracks of the second and fourth embodiment and rubber-tired wheels of the third embodiment. All are equivalent and can be substituted as required.

Referring to FIG. 16, there is shown an additional second embodiment 371 of an oscillating means for use in muck piles of particularly difficult loading characteristics. It differs from the previously described oscillating means by providing apparatus and method which superimposes one type of oscillation upon another type of oscillation of the penetrating means so as to provide a compound oscillation of two distinct oscillations, i.e., at least two modes of oscillation which can be applied to any penetrating means as described. The penetrating means 238 of FIG. 9 is shown hinged for oscillation about the penetrator axis 240 adjacent the forward portion 224 of the primary conveyor assembly 221. The penetrator moment arm 251 extends from the axis 240, but the oscillating cylinder 254 of FIG. 9 is eliminated and a separate compound oscillation apparatus 373 is substituted. The apparatus 373 includes a large stroke hydraulic cylinder having a first portion or body 376 hinged to the forward portion 224, and a second portion or piston rod 378 extending therefrom. The rod 378 carries a small stroke cylinder 380 aligned therewith and having a respective short piston rod 382 connected to an outer end of the moment arm 251. It can be seen the compound oscillating apparatus 373 includes large and small stroke hydraulic actuators or cylinders arranged in series with each other and extending between the primary conveyor assembly and the arm 251 to provide means equivalent to those as previously described for rotationaly oscillating the penetrating means 50.

In operation, the apparatus 373 recieves two distinct sets of hydraulic signals for the two cylinders, but these sets are usually related. The cylinder 375 receives relatively large volume, low frequency, flow signals to swing the means 238 through the angles 245 and 248 about the datum. The cylinder 380 receives relatively lower volume, higher frequency, flow signals to oscillate the means 238 through smaller displacments 384 at the tip 239 shown in broken outline at the three particular positions, but of course the higher frequency oscillations are applied to the tip for the full swinging between the upper and lower extreme positions. Total disolacement 385 of the tip due to actuation of the cvlinder 375 is of the order of thirty centimeters maximum as previously described, whereas the displacment 384 could be less than one centimeter in some instances. The frequency of oscillation of the cylinder 375 can vary from zero to about one hundred cycles per minute, depending on amplitude, and the frequency of the cylinder 380 can vary between zero and several thousand cycles per minute, also depending on the amplitude.

FIG. 17 depicts an additional (fourth) embodiment of the invention. Inasmuch as the loader 400 incorporates features from the previous embodiments, a detailed description of the loader 400 is unnecessary. However a few highlights may be helpful.

The loader 400 includes body 424 mounted upon tracks 422. Endless conveyor 402 transports material from the penetrating means 410 over the body 424 to a suitable conveyance (not shown). The conveyor 402 is divided into segments: forward conveyor portion 404 and rear conveyor portion 406. The forward conveyor portion 404 is supported by forward conveyor assembly 414 whereas the rear conveyor portion 406 is supported by rear conveyor assembly 416. Both conveyor assemblies 414 and 416 pivot about hinge 408. The conveyor chain or belt 402 revolves about returning members (spindles) 418 and 420.

Cylinder 426 rotates the rear conveyor assembly 416 and cylinder 428 rotates the forward conveyor, assembly 414 about the hinge 408. Optional ground clamp 432 fixedly attaches the loader 400 to the ground. Cylinder 430 will cause the loader 400 to move forwardly (or rearwardly) as it retracts (or extends). Cylinder 434 raises and lowers the cylinder 430 and as a consequence, the clamp 432. Power pack 436, which is defined to encompass any prime mover (electric motor, internal combustion motor, air motor, etc.) to supply the mechanical energy required to propel and operate the loader 400. Bumper bar 438 protects the loader 400 from rear-end collisions.

As in all the previous embodiments, the penetrating means 410 and the forward returning member 420 both rotate about the same common axis 412. The configuration permits the loader 400 to fluidize the muck pile and allow it to flow onto the conveyor 402. The cylinder and linkage combination for oscillating the penetrating means 410, not shown in FIG. 17, is similar to the cylinder and linkage combinations of the other embodiments.

Some general principles of loader operation learned during prototype test are given below:

Three forces must be applied to the pentrating means to make it rapidly penetrate the muck pile on a desired path.
(i) Force 1 with a mainly horizontal component
(ii) Force 2 with a downward component to resist climbing in the muck pile.
(iii) Force 3 with an upward component to disturb the muck pile thereby increasing the penetration rate.

The first force is maintained when advancing into the muck pile. The second and third forces are varied during the oscillating cycle. The forces described above are believed to be applied within the boundaries of the penetrating means. The actual point of application depends on the point of reaction developed by the material surrounding the penetrating means. This material may vary from hard bedrock to a finely divided sand-like consistency. The actual movement of the lip cannot be predicted because of this variable consistency. However it is apparent that although, in free air, the penetrating means oscillates about its pivot axis and the leading edge moves in an arc, under load the leading edge arc movement is greatly reduced and the penetrating means axis is forced to rise and fall. It follows that when the penetrating means is oscillated about a primary axis under load in a muck pile a secondary axis of rotation of the penetrating means relative to the bedrock is formed. The location of the secondary axis varies according to the resistance encountered and falls within the distance from the primary axis to the leading edge of the penetrating means The effect of oscillation of the penetrating means may be demonstrated by entering the pentrating means and conveyor into the muck pile, with the penetrating means angle approximately parallel to the desired line of advance until penetration is arrested by the resisting forces of the near static muck pile. At this point penetration is resumed when the penetrating means is oscillated. Oscillation fluidizes the muck and enhances flow onto the conveyor. When the desired depth of penetration has been achieved and the lower part of the running conveyor is well covered with muck the mainly horizontal force can be reduced and oscillation can be used as required to regulate and optimize the flow of material onto the conveyor and thus prevent conveyor overload.

A typical range of oscillation is with the lower flat surface of the penetrating means angled approximately 10° downwards from the desired plane of advance to approximately 5° upwards with a free arc movement at the leading edge of approximately 5 (12.7 cm). When it is desired to advance on a grade line (as in forming a mine roadway) it is necessary to maintain a considerable downforce on the penetrating means. This can be acheived by using the elevating cylinders in the retract mode to force the penetrating means downwards, transferring a considerable portion of the machine mass onto the penetrating means. It is desireable to arrange that the lower face of the penetrating means is deflected downwards from the desired plane of advance for a greater duration of time and at a greater angle than it is above that same plane in both duration and angle.

The frequency of oscillation may be varied to suit the muck pile encountered. A typical frequency range is 20 to 40 cycles per minute. The heel of the penetrating means (the part below the common axis), rising and falling, compacts and distributes the remaining muck which has not been loaded so as to form a roadbed as the machine advances.

The ratio of the interior width of the conveyor to width of the penetrating means may be critical for efficient operation. The nearer the ratio is to unity the more freely the muck will flow onto the conveyor. As the ratio is reduced the tendency of the muck to bridge against the sides of the conveyor is increased and the flow of muck is reduced it is preferred to have a minimum ratio of about at least 0.7. The conveyor skirt configuration is also important so that flow is not impeded by abrupt and vertical surfaces. The moment arms attached to the penetrating means must also minimize restriction to material flow.

The shapes of the upper and lower surfaces of the penetrating means appear to be important to its effective operation. The upperside of the penetrating means must present a smooth concave surface to allow muck to slide from the leading edge to a point adjacent to the lower end of the conveyor where the flights and chains can pick it up. The lower side of the penetrating means presents a flat surface which will provide clearance for the leading edge and also blend with the lower side of the conveyor so as to minimize drag as the machine advances. Both upper and lower sides are fixed in relation to the other. The penetrating means is capable of rotation about its axis approximately 60° up or 30° down from the horizontal when the machine is at rest on horizontal surface with the conveyor in its lowered position nearest to the horizontal surface. The 60° up position may be used for scooping up the last of the muck and inducing it to fall on the conveyor during cleanup operations. The 30° down position may be used to remove muck remaining at the face, dragging it away so as to leave a clear area for drilling a set of holes for explosives.

Tests utilizing prototype loaders made in accordance with the teaching of this specification were conducted at Inco Limited's hard rock sites in Sudbury, Ontario to evaluate the instant invention and its ability to continuously load broken ore and rock. A number of tests were conducted. One (test 3) is still ongoing. See Table I below.

In test number 1, a rail mounted loader (similar to embodiment 1) was tested in a coarse rock stockpile at Inco's Murray Pit area on the surface. In test number 2, a crawler mounted loader (similar to embodiment 4) was tested in a pit ore stockpile located on the surface. In test number 3, the same loader was tested underground in Inco's Copper Cliff North Mine under operating conditions in run of mine ore from the stopes located on the 3935 (foot) level.

For the second and third tests, the loader had the capacity of moving the penetrating means through an 18 inch (45.7 cm) stroke from its bottom position to the extreme upper position. Under normal operating conditions a 5 inch (12.7 cm) stroke appears to give the best results. The frequency of the oscillation at a 5 inch stroke is 30 oscillations per minute. For the first test conveyor on the loader was 61 inches (155 cm) wide and was rated at a speed of 75 feet (23 m) per minute. For the second and third test, the conveyor width was 70 inches (178 cm) with a rated speed of 110 feet (33.5 m) per minute.

TABLE I

|  | TEST # | | |
| --- | --- | --- | --- |
|  | 1 | 2 | 3 |
|  | Murray Pit | Pit Ore Stockpile | Copper Cliff North Mine |
| Location | Surface | Surface | 3935 Level |
| Material Handled | | | |
| Type | Rock | Low Grade Ore | Ore |
| Insitu Specific Gravity | 2.85 | 3.05 | 3.25 |
| Size Gradation | | | |
| % +2 ft. | 5 | 15 | 5 |
| % 2 ft-1 ft. | 40 | 40 | 20 |
| % 1 ft-6 in. | 40 | 30 | 25 |
| % −6 in. | 15 | 15 | 50 |
| Loader Undercarriage | Rail Mounted | Crawler | Crawler |
| Material Loaded to- | 26 Ton Truck | 26 Ton Truck | 32 Ton Truck |
| Average Loading Time/Truck | 4 min 14 sec. | Not recorded | 1.5 minute |
| Average Tons per Minute Loaded | 6.15 | Not recorded | 21.3 |
| Total Tons Moved | 8400 | 7600 | N/A |
| Period of Test | Oct. 24 to Nov. 29/83 | Month of April 1984 | Summer 1984 (ongoing) |

The rate of tons per minute loaded is far higher than for conventional haulage loading methods.

It should be noted that there is a difference between removing broken rock from the face of a tunnel (which the prior art generally addresses) and from a draw point.

Reviewing the above results it may be seen that the combined action of the penetrating means and conveyor, oscillating about a single common axis fluidizes the rock pile. This fluidizing action causes the material to expeditiously flow onto the conveyor and away from the pile at a high rate hitherto unknown.

It should be noted that the invention is extremely useful in headings having low headroom. By disposing the various elevating and oscillating cylinders (i.e., 428, 157, 163, 267, 254, 48, 61, 149, 308 etc.) below the conveying structures, low apparatus height is achieved. This highly desirable feature should be contrasted with prior art designs utilizing cumbersome overhead pulleys and gearings.

While in accordance with the provisions of the statue, there is illustrated and described herein specific embodiments of the invention those skilled in that art will understand that changes may be made in the form of the invention covered by the claims and that certain features of the invention may sometimes be used to advantage without a corresponding use of the other features.

The embodiments of the invention in which an exclusive property or privilege is claimed are defined as follows:

1. A mobile continuous loading apparatus disposed on a surface, the apparatus comprising a body having a distal end, a proximal end, a longitudinal axis, a conveyor assembly having an endless conveying surface disposed on the body, the conveyor assembly divided into a proximal section and distal section by a hinge axis disposed transverse to the longitudinal axis, a single, shallow penetrating means cooperating with the proximal section of the conveyor assembly, the penetrating means adapted for introduction into a material pile and for continuously loading the material onto the conveyor assembly, the penetrating means and the proximal section sharing a common horizontal axis transverse to the longitudinal axis, the penetrating means pivotally mounted about the common horizontal axis, first independent means for pivotally oscillating the penetrating means about the common horizontal axis independently of the proximal section, the moving conveying surface circumscribing a returning member, the returning member disposed about the common horizontal axis so that the moving conveying surface rotates about the common horizontal axis, the first independent means adapted to selectively change the inclination of the penetrating means and separately to continuously oscillate the penetrating means through a predetermined arc during loading and conveying of the material, second independent means for changing the inclination of the proximal section of the conveyor assembly through a second arc about the hinge axis to change the vertical position of the penetrating means and separately for selectively causing a downward force on the transverse axis during the continuous oscillation of the penetrating means to react against a substantial portion of the mass of the apparatus, the penetrating means adjustably adapted to lie approximately parallel to or substantially flat on the surface when engaged therewith, and means for advancing the penetrating means.

2. The continuous apparatus according to claim 1 wherein the first and second independent means elevate the conveyor assembly and pivot the penetrating means simultaneously or sequentially.

3. The continuous apparatus according to claim 1 wherein the predetermined arc is about 15°.

4. The continuous apparatus according to claim 1 wherein the first means for oscillating the penetrating means are affixed to the proximal section of the conveyor assembly.

5. The continuous apparatus according to claim 1 wherein the penetrating means includes an upper surface and lower surface secured together by a concave rear wall, the concave wall concentric with the common horizontal axis, a lower body member extending toward the proximal end and terminating in an upwardly curved lip, the lip adjacently complimentary to the concave rear wall and concentric with the common horizontal axis, the concave rear wall and the body member cooperating to form a flow path for directing the material onto the conveying surface, and the lower body member further cooperating with the penetrating means by providing surfaces through which down forces may be transmitted to the surface upon which the apparatus is disposed.

6. The apparatus according to claim 1 wherein the ratio of the interior width of the conveyor assembly to the width of the penetrating means is about 0.7:1.0 to about 1.0:1.0.

7. The continuous apparatus according to claim 1 wherein the conveyor assembly is slideably mounted to the body, the conveyor assembly being movable relative to the body along the longitudinal axis of the body.

8. The continuous apparatus according to claim 1 wherein a second conveyor assembly is mounted on the body to accept the material from the first conveyor assembly.

9. A continuous method of loading and transporting material onto a loading apparatus positioned on a surface, the method comprising utilizing an apparatus situated on the surface and having a body and a conveyor assembly mounted on the body and adapted to transport material from a front portion of the conveyor assembly to a rear portion thereof along a longitudinal conveyor axis, the front portion of the apparatus having a single, shallow oscillatory penetrating means pivoted about a horizontal transverse axis disposed normally to the longitudinal axis, the horizontal transverse axis common to both the fromt portion of the conveyor assembly and the penetrating means, first independent means for selectively changing the inclination of the penetrating means and separately for oscillating the penetrating means, second independent means for elevating the front portion of the conveyor assembly, the penetrating means capable of being adjusted so as to lie approximately parallel to or substantially flat on the surface, and;
(a) advancing the penetrating means directly into the material to be loaded, and
(b) energizing the first independent means and conveyor apparatus, and
(c) continuously oscillating the penetrating means about the horizontal transverse axis through a predetermined arc to continuously fluidize the material and cause the material to continuously flow onto the conveyor assembly, and
(d) applying a downward force during the continuous oscillation of the penetrating means to the horizontal transverse axis utilizing a substantial portion of the weight of the apparatus against which to react.

10. The continuous method according to claim 9 including laying the penetrating means down on the surface and approximately parallel therewith.

11. The continuous method according to claim 9 including forming a roadbed without withdrawing the apparatus.

12. The continuous method according to claim 9 wherein the transverse axis is positioned at a predetermined height above the surface and approximately maintained at the predetermined height while the penetrating means is oscillated through the arc to fluidize the material and further advanced into the material.

13. The continuous method according to claim 12 wherein the penetrating means is inserted into the base of the material.

14. The continuous method according to claim 9 wherein the penetrating means is oscillated through the predetermined arc of about 15°.

* * * * *